United States Patent
Weibrecht et al.

(10) Patent No.: US 6,906,727 B2
(45) Date of Patent: Jun. 14, 2005

(54) METHOD OF REPRODUCING A GRAY SCALE IMAGE IN COLORS

(75) Inventors: Martin Weibrecht, Aachen (DE); Peter Quadflieg, Aachen (DE); Gerhard Speckowius, Roetgen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 287 days.

(21) Appl. No.: 10/040,181

(22) Filed: Oct. 23, 2001

(65) Prior Publication Data

US 2002/0131634 A1 Sep. 19, 2002

(30) Foreign Application Priority Data

Oct. 27, 2000  (DE) .......... 100 53 301

(51) Int. Cl.$^7$ .................. G09G 5/02
(52) U.S. Cl. ............ 345/600; 345/581; 345/587; 345/597; 345/601; 345/603; 345/604
(58) Field of Search .............. 345/600, 581, 345/587, 597, 601, 603, 604

(56) References Cited

U.S. PATENT DOCUMENTS 3,541,233 A   11/1970   Ayres .......... 178/5.2
5,469,275 A * 11/1995   Edgar .......... 358/458

FOREIGN PATENT DOCUMENTS

FR   2301021   2/1975   .......... G01T/1/136

* cited by examiner

Primary Examiner—Matthew C. Bella
Assistant Examiner—Tam Tran

(57) ABSTRACT

The invention relates to a method of reproducing a gray scale image (1) in colors on a color monitor (6), in which method each shade of gray (2) is assigned, using a look-up table (4, 5), a given output value (R, G, B) for driving the electron guns (8R, 8G, 8B) of the color monitor. Assignment is performed in such a manner that a given color deviation is imparted to successive shades of gray, which deviation enables differentiation of the shades of gray by a human observer without such deviations becoming disturbing. Consequently, the information concerning the optical density of the original gray scale image (1) is preserved; this is important notably for the interpretation of medical images. Additionally, the special display properties of the monitor (6) and/or the ambient circumstances can be taken into account in the look-up table (4, 5) in order to optimize the reproduction of the gray scale image.

12 Claims, 1 Drawing Sheet

METHOD OF REPRODUCING A GRAY SCALE IMAGE IN COLORS

FIELD OF THE INVENTION

The invention relates to a method of reproducing a gray scale image in colors, which method assigns a color value and a brightness to each shade of gray.

BACKGROUND OF THE INVENTION

Optimum reproduction of medical gray scale images requires an as large as possible number of brightness levels that can be distinguished by human observers. The number of shades of gray that can be distinguished in practice is dependent on the brightness that can be achieved and on the contrast range of the reproduction medium. Therefore, diagnostic applications usually employ film copies, since films have a contrast range of up to three orders of magnitude and are observed on view boxes that produce luminance values of up to 6000 cd/m².

However, because of the deployment of contemporary digital imaging methods such as, for example X-ray computed tomography or magnetic resonance tomography as well as the use of image filing systems, there is an increasing tendency to reproduce digital image data also on monitors. Customary color monitors as they are encountered, for example in personal computers are often used for this purpose. In comparison with view boxes such monitors have a low light level with a luminance of typically 100 cd/m² so that they produce significantly fewer shades of gray that can be differentiated.

Therefore, U.S. Pat. No. 3,541,233 and FR 2 301 021 deal with attempts to compensate the smaller reproduction range of color monitors by means of false color reproduction. According to this false color reproduction method a shade of gray is represented by an arbitrary color that is selected at random. The originally monochrome images, therefore, have a colored appearance. Because the human eye is capable of differentiating a number of colors that is much larger than the number of shades of gray that can be differentiated, the false color reproduction method also enables differentiation by the human observer of those shades of gray that could no longer be differentiated on the basis of their brightness value. The false color reproduction method, however, is inadequate for the reproduction of medical gray scale images, because the optical density of the monochrome images reflects properties of the tissue and hence is of essential importance in the image interpretation by the physician. This density information is arbitrarily encoded in images that are reproduced by the false color method, thus preventing interpretation.

Considering the foregoing it was an object of the present invention to provide a method of reproducing a gray scale image in colors which enables a large number of shades of gray to be reproduced so that they can be differentiated and at the same time enables the interpretation of medical gray scale images.

SUMMARY OF THE INVENTION

This object is achieved by means of a method in conformity with the characterizing part of claim 1. Advantageous further versions are disclosed in the dependent claims.

According to the method for reproducing a gray scale image in colors a color value and a brightness are assigned to each shade of gray to be reproduced. The color value can be described, for example by the standard color value components x and y and the brightness by the standard spectral value Y (see detailed description hereinafter). Assignment is carried out in accordance with the invention in such a manner that a monotonic relation exists between the original shades of gray and the brightness and that the associated color values are selected from the range of a predetermined reference color.

The monotonic relation between shades of gray and brightness means that in comparison with a brighter shade of gray a darker shade of gray is reproduced with a lower brightness or at best with the same brightness. In the case of a negative reproduction, the relation may also be reversed. The information concerning the optical density of the tissue that is contained in the shades of gray in medical images is thus preserved essentially in the brightness of the transformed image. Preferably, the relation between shades of gray and brightness is strictly monotonic, that is, different brightnesses are associated with different shades of gray.

Furthermore, the color values assigned to a shade of gray are selected from the range of a predetermined reference color. This range should be chosen so as to be comparatively small; this can be parameterized accordingly while defining a given colorimetric system. For example, when standard color value components are used (CIE system in conformity with DIN 5033), it may be specified that in an absolute sense the assigned color value components x, y may deviate approximately 0.01 and that in a relative sense they may deviate no more than 10%, preferably no more than 3%, and notably no more than 1.5%, from the standard color value components $X_R$, $Y_R$ of the reference color.

The described rule for assignment on the one hand preserves the information on the optical density of tissue in medical images that is contained in the shades of gray while on the other hand it aids the differentiation of neighboring shades of gray by controlled addition of slight but still noticeable color deviations between the shades of gray. As opposed to the known false color reproduction, the addition of small color deviations preserves the overall impression of the image and hence the interpretability of the image data in the sense of optical density. A physician can thus read the images in conformity with his or her experience and is additionally assisted in differentiating the smallest deviations in the shades of gray.

The reference color in the range of which the color values to be assigned to the shades of gray are to be selected is, for example white (or gray, depending on the brightness). It is thus achieved that the image remains essentially a gray scale image in which the individual shades of gray merely have small color casts so as to enhance differentiation.

The color values are assigned to the shades of gray preferably in such a manner that different color values are assigned to two successive shades of gray. It is thus ensured that a human observer can differentiate the two shades of gray on the basis of the color values. In conformity therewith, the step between the assigned color values should be chosen so as to be so large that they can be suitably differentiated by the human eye. When two neighboring gray levels can already be differentiated by the human observer without modification, the assignment of different colors can be dispensed with so as to avoid irritations due to coloring as much as possible.

The assignment of color values to the shades of gray of the original gray scale image can also be performed in a bijective manner. A color value is then reversibly unambiguously assigned to each shade of gray, so that the information contained in the shades of gray will in any case be contained a second time in the color values without loss. Such bijective assignment also ensures that the same color value is not assigned to two different shades of gray, as otherwise there would be the risk of mixing up of these shades of gray.

In conformity with a further version of the method, the n shades of gray present are assigned, in an ascending order, a recurrent series of $m \leq n$ different color values $((x_1, y_1 0, \ldots (x_m, y_m))$. When m=n, the previously described bijective association between shades of gray and color values is obtained. However, if m<n, there will be shades of gray that are assigned the same color value, for example $(x_1, y_1)$. However, in conformity with the rule of assignment, these shades of gray will be separated by m intermediate shades of gray. When m is chosen so as to be sufficiently large, therefore, the risk of mixing up of shades of gray with the same assigned color value can be avoided. The use of a recurrent series of m different color values for the differentiation of the shades of gray offers the advantage that the arbitrariness in the assignment of color values to the shades of gray is reduced by the fixed order of the m color values. Two neighboring color values $(x_i, y_i)$ and $(x_{i+1}, y_{i+1})$ thus encode the same order (smaller or larger) of their associated shades of gray on each shade of gray of the image. For example, when a reddish zone and a bluish zone are situated adjacent one another in a dark region of the image and the reddish zone corresponds to a gray value $G_1$ which is one shade darker than the bluish zone, a reddish zone in a brighter region of the image also corresponds to a gray value $G_2$ which is also one shade darker than a bluish zone; it is to be noted, of course, that because of the different initial shades $G_2$ is much brighter than $G_1$.

The reproduction in color of the gray scale image can in principle take place on all suitable media, for example in multicolor print also. Reproduction, however, preferably takes place via a color monitor, in which case the assignment of shades of gray on the one side and color values and brightness on the other side is preferably adapted to the available dynamic range of the color monitor. The increasingly more common reproduction of medical images on color monitors can then make optimum use of the resources, the image at the same time being or remaining interpretable from a medical point of view.

When the color image is reproduced on a color monitor, the rule of assignment between the shades of gray of the original gray scale image and the control of the primary colors of the color monitor is preferably stored in a look-up table. Such a look-up table offers the advantage that it enables simple implementation of arbitrary rules of assignment that can be drafted, for example experimentally and/or theoretically, and that their use enables a very fast transformation.

When drafting the rule of assignment for a look-up table it is additionally possible to take into account the effect of the ambient brightness on the reproduction capabilities of the monitor. This means that a different rule of assignment between shades of gray and primary colors can be chosen in dependence on the measured ambient brightness, the relevant rules of assignment as a function of the ambient brightness being stored in the look-up table.

The invention also relates to a device for reproducing a gray scale image in colors, which device includes a transformation unit in which a color value and a brightness are assigned to each shade of gray of the gray scale image. The transformation unit is arranged in such a manner that it is capable of carrying out a method of the kind set forth. This means that monotonic assignment of shades of gray and brightness is performed in the transformation unit and that the color values are selected from the range of a predetermined reference color. The transformation unit may also be arranged in such a manner that it carries out the versions of the method described above.

The device may notably include a color monitor reproducing the gray scale image in colors. Such a device is then suitable for reproducing medical gray scale images on a conventional color monitor; despite a limited dynamic range of the color monitor, the thus enabling interpretation of the image by a physician. Notably X-ray apparatus, computed tomography apparatus, magnetic resonance tomography apparatus and/or ultrasound apparatus are suitable sources of a medical gray scale image.

BRIEF DESCRIPTION OF THE DRAWINGS

The invention will be described in detail hereinafter, by way of example, with reference to the Figures. Therein.

DETAILED DESCRIPTION OF THE PREFERRED EMBODIMENTS

Figure 1:
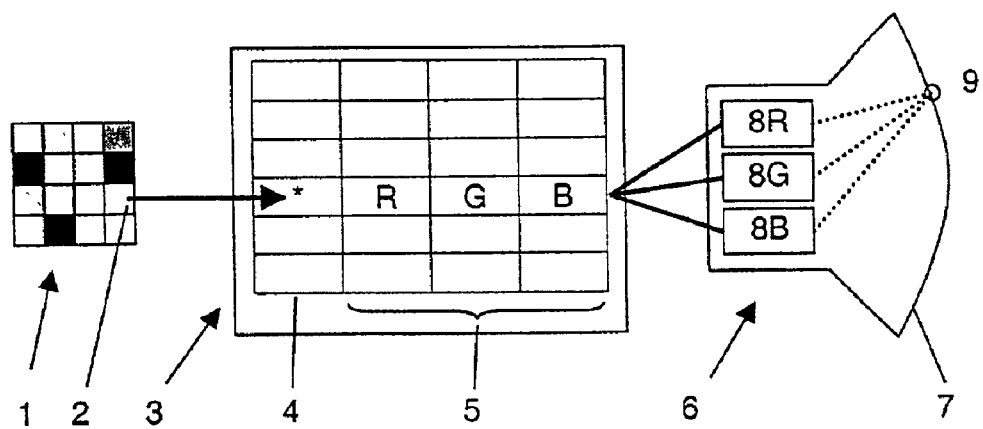
FIG. 1 shows diagrammatically a device for reproducing a gray scale image in colors on a color monitor.

FIG. 1 shows diagrammatically the elements that are necessary for the display of a gray scale image 1 on a color monitor 6. The color monitor 6 in the present embodiment is a cathode ray tube, but any suitable display system could in principle be used for this purpose, for example a liquid crystal display (LCD), a PDP (Plasma Display Panel) or the like. The pixels 2 of the gray scale image 1 are grouped in discrete, digitally encoded shades of gray; typically 256 different shades of gray can be distinguished.

In the transformation unit 3, performing the conversion of the shades of gray of the image 1 into control signals (Digital Driving Levels or DDL) for the color monitor 6, the 256 different shades of gray possible are tabulated in the column 4 of a look-up table which comprises 256 lines. The look-up table also comprises three columns 5 in which the respective control signals R, G and B that serve for the three electron guns 8R, 8G and 8B of the color monitor 6 and are associated with the shades of gray of the first column 4 are contained.

Thus, when a given pixel 2 of the gray scale image 1 is to be displayed on the color monitor 6, first the shade of gray of the pixel is determined and the associated line of the look-up table 4, 5 is searched. From this line the driving signals for the color monitor 6 can be read and applied to the electron guns thereof. The electron guns 8R, 8G, 8B then cause, in known manner, luminescence by a respective associated dot on the color screen 7 of the color monitor 6 in conformity with the strength of its respective driving signal, the three light dots together forming a color pixel 9 of the color monitor.

If no additional steps are taken, the brightness and contrast range of the color monitor 6 will limit the number of shades of gray that can be reproduced on the display screen 7 so that this number will be less than necessary for loss-free reproduction of the gray scale image 1. In addition to this basic problem, that is, the problem that the display screen 6 of low luminosity produces only a limited number of shades of gray that can be differentiated, the conventional method also leads to losses of image quality that are due to practical limitations. In conventional image display systems the color channels whereby the primary colors of the color monitor (generally speaking: red, green and blue) are controlled are quantized in 256 levels (8 bits). In order to reproduce a gray scale image, generally each of the channels is driven by the same digital signal. This gives rise to the problems to be described hereinafter.

On the one hand it has been found that the intrinsic gray scale distribution of a monitor is not optimally adapted to the gray scale sensitivity of a human observer. It is exactly in respect of the fundamentally small number of shades of gray that can be distinguished in the case of color monitors that such adaptation, however, is particularly important. The adaptation should conventionally be achieved by means of so-called LUT operations (LUT: Look-Up Table). The digital gray value of an image point is then mapped on a digital value by means of a look-up table with the aim to realize the desired shade of gray on the display screen. As has already been described, in a color system of this kind a column is provided in the look-up table for each color channel. When the same digital gray value is mapped on each color channel of the display system in the case of gray scale images, such a rule of assignment can also be described by a look-up table that comprises a single column and whose output values are applied to all color channels of the monitor in the same way. However, a problem is then encountered since the customary table has 256 entries which can be utilized by 256 different starting values only (8 bit-to-8 bit mapping). In order to achieve non-linear mapping, as is necessary for the correction of the intrinsic gray scale distribution of the display system, therefore, many of the 256 output values must be utilized several times, whereas other values are not used at all. Consequently, a loss of shades of gray occurs in the output signal. For example, in the following Table the values 1 and 2 no longer occur in the output signal whereas the values 0, 3 and 255 are used twice.

| In | Out Red | Out Green | Out Blue |
|---|---|---|---|
| 0 | 0 | 0 | 0 |
| 1 | 0 | 0 | 0 |
| 2 | 3 | 3 | 3 |
| 3 | 3 | 3 | 3 |
| ... | ... | ... | ... |
| 254 | 255 | 255 | 255 |
| 255 | 255 | 255 | 255 |

In this respect WO 00/36825 discloses a method for a special black and white monitor with three separate electron guns which enables loss-free reproduction of all shades of gray to be realized despite non-linear mapping.

A further problem encountered in the reproduction of gray scale images on color monitors is due to the physiological fundamentals of color perception by a human observer. From the theory of color perception it is known that the brightness impression of a color presented is additively derived from the luminance contributions by the primary colors used by the monitor. The color impression, however, is determined by the ratio of the luminance contributions by the primary colors. Therefore, in order to obtain the same color impression for different brightnesses, the ratio of the luminances of the primary colors must be kept constant. Thus, when the brightness is to be increased by, for example 10% for the same color impression, the luminance contribution by each primary color must be increased by 10%.

According to the conventional LUT methods, however, not the actual luminance contributions by the primary colors are increased to an equal extent, but rather the digital LUT output values of the color channels (see the above Table). Because the luminance contributions by the color channels of a monitor, however, usually exhibit different dependencies on the digital LUT output values, the ratio of the primary colors varies in an uncontrolled manner across the dynamic range of the monitor. For example, it is thus possible that a monitor which has a blue cast for a bright gray has a reddish color tone for a darker gray.

The method in accordance with the invention solves the above problems by way of a suitable occupation of the look-up table 5 in the transformation unit 3. The calculation of the entries for the look-up table 5 will be described in detail hereinafter.

First the display system is calibrated, said calibration determining for each color channel the relationship between the digital output values of the look-up table 5 and the luminance produced in the associated light dot of the pixel 9. Calibration can be performed by complete measurement of all digital values or by way of a model for which suitable parameters are determined. The evaluation of the calibration measurement or the model is performed in the same way as described in WO 00/36825, that is, the overall luminance is additively composed of the contributions by the individual color channels, it being possible to take into account saturation effects. Ambient light effects can also be taken into account by utilizing a suitable ambient light sensor. The calibration thus reveals the minimum luminance and the maximum luminance that can be produced by the display system in the current conditions, and also the characteristic curves of the individual channels. Moreover, the colorimetric co-ordinates $(x_r, y_r)$, $(x_g, y_g)$ and $(x_b, y_b)$ of the color channels are also taken up in the calibration data. A desired, optimum gray shade function can be derived from the knowledge of the luminance range; this operation can be performed, for example in conformity with the United States DICOM standard.

Such gray shade functions, however, specify only the luminance to be produced by the monitor. No indications are given as regards the color points of the shades of gray. The method in accordance with the invention utilizes this freedom so as to define a suitable color point additionally for each gray value. For example, a sequence of shades of gray that alternates between two or more color points may be realized, the color deviations being kept so small that no disturbing color effects arise but the differentiation of neighboring shades of gray is assisted nevertheless.

Figure 2:
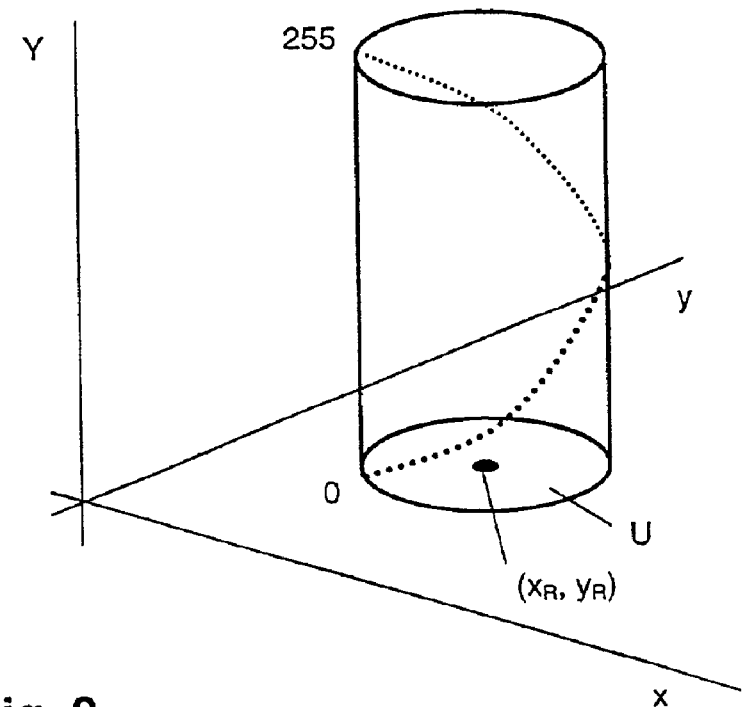
FIG. 2 illustrates diagrammatically a rule of assignment between shades of gray and color values in a color value diagram.

FIG. 2 illustrates such a rule of assignment graphically in the system of standard color value components x, y and the brightness Y (see definition hereinafter). Whereas in conformity with the present state of the art a given reference color $(x_R, y_R)$ (typically white/gray) is selected and maintained for the reproduction of all original shades of gray 0 to 255, in accordance with the invention the shades of gray 0 to 255 are distributed in a comparatively small range U around the reference color $(x_R, y_R)$. The restriction to a small range U ensures coloring is not superposed with disturbing effects on the gray value information. Furthermore, the association between the shades of gray 0 to 255 and the color values (x, y) preferably is realized in conformity with a given system, for example as shown in FIG. 2, involving increasing shades of gray along a spiral-like line. A monotonic relationship is then formed between the shades of gray and the brightness Y, so that the resultant curve always ascends (or is locally horizontal in any case).

When the sequence of gray shades has been completely specified in a suitable manner, the contributions by the individual color channels of the monitor that are required for its transformation can be calculated. The theoretical principles for this calculation are based on colorimetry. In conformity with the theory of colorimetry, the human eye is modeled by three different color receptors. Two optical stimuli are experienced as being the same when they excite the three color receptors in the same way. This holds even when the stimuli have completely different spectral distributions. Using suitable spectral weighting functions, that is, the so-called spectral value curves, three characteristic numbers that exactly define the color perception can be determined by integration of the emission spectrum of an optical stimulus. If the curves for a basic system of primary colors were determined by perceptional attempts, any other basic system can be derived therefrom by linear combination. The so-called standard spectral curves $\bar{x}$, $\bar{y}$ and $\bar{z}$ are obtained in this manner. These curves are characterized inter alia by the fact that $\bar{y}$ is the degree of spectral brightness sensitivity. When the spectral distribution of a stimulus is weighted with each time $\bar{x}$, $\bar{y}$ and $\bar{z}$ and integrated, the so-called standard spectral values X, Y and Z are obtained. Because $\bar{y}$ is the degree of spectral brightness sensitivity, the integral Y equals the luminance of the stimulus in the case of suitable standardization.

In order to achieve a separation of brightness perception and color perception, the standard spectral values are normalized to the sum of X, Y and Z. The normalized quantities $$x = X/(X+Y+Z) \text{ and } y = Y/(X+Y+Z)$$

are called standard color value components. The standard color value components x and y define a color point, independently of their brightness. The third component $$z = Z/(X+Y+Z),$$

can be unambiguously derived from x and y by means of the relation $x+y+z=1$ and is no longer necessary for color definition. The red, green and blue phosphors of a color television tube are thus specified by their standard color value components $(x_r, y_r)$, $(x_g, y_g)$ and $(x_b, y_b)$. When the standard color value components and the luminance contributions $(Y_R, Y_G, Y_B)$ by the primary colors of a monitor are known, the standard spectral values of the color stimulus reproduced can be calculated by way of the following matrix equation:

$$\begin{pmatrix} X \\ Y \\ Z \end{pmatrix} = \begin{pmatrix} a_R & a_G & a_B \\ 1 & 1 & 1 \\ b_R & b_G & b_B \end{pmatrix} \begin{pmatrix} Y_R \\ Y_G \\ Y_B \end{pmatrix}$$

where $a=x/y$ and $b=z/y=(1-x-y)/y$.

Conversely, the luminance contributions of the primary colors of the monitors which are necessary to realize a predetermined color stimulus (yT, xT, yT) or (XT, YT, ZT) can be realized by inversion of the matrix:

$$\begin{pmatrix} Y_R \\ Y_G \\ Y_B \end{pmatrix} = \frac{1}{N} \begin{pmatrix} (b_B - b_G) & (a_B b_G - a_G b_B) & (a_G - a_B) \\ (b_R - b_B) & (a_R b_B - a_B b_R) & (a_B - a_R) \\ (b_G - b_R) & (a_G b_R - a_R b_G) & (a_R - a_G) \end{pmatrix} \begin{pmatrix} X_T \\ Y_T \\ Z_T \end{pmatrix},$$

$$N = a_R b_B + a_G b_R + a_B b_G - a_R b_G - a_G b_B - a_B b_R.$$

This equation represents the relationship between the desired color signal and the necessary luminance contributions of the primary colors. When a color stimulus is predetermined, the contributions of the individual color channels are determined from this equation.

After the relevant luminance contributions of the color channels have thus been determined for the desired gray shade function, the corresponding LUT output values can be determined by means of the calibration data of the color channels. This is a search operation which determines that LUT output value for which the luminance realized approximates as closely as possible the respective luminance required for the relevant channel. After this step, individually determined LUT values are available for each channel. These values can be observed together for all channels and be enhanced in an optimization step in conformity with a given error criterion. For example, the LUT values found can be permuted within given limits for each shade of gray, so that the resultant overall luminance approximates the necessary luminance more closely. Such optimization will usually reduce the accuracy of the adjusted color point, but it has been found in practice that this is not a problem. A look-up table with 256 shades of gray thus determined for an 8-bit system is printed in part hereinafter. It is a special feature of this table that there is no duplication of entries, meaning that the Table produces 256 different gray values despite the limitation of the three color channels to 8 bits. The data relates to a conventional color monitor with the following color points red: (0.619, 0.341); green: (0.296, 0.589); blue: (0.144, 0.06). The LUT implements the DICOM standard on the display system, a color difference $(\delta x, \delta y)=(0.01, 0.01)$ then being formed between neighboring shades of gray.

| In | Out Red | Out Green | Out Blue |
|---|---|---|---|
| 0 | 0 | 0 | 0 |
| 1 | 24 | 24 | 32 |
| 2 | 19 | 28 | 39 |
| 3 | 30 | 30 | 37 |
| 4 | 26 | 34 | 41 |
| 5 | 33 | 35 | 40 |
| 6 | 32 | 37 | 45 |
| 7 | 34 | 39 | 44 |
| 8 | 33 | 41 | 47 |
| 9 | 39 | 41 | 47 |
| 10 | 38 | 43 | 48 |
| ... | ... | ... | ... |
| 241 | 239 | 239 | 239 |
| 242 | 233 | 241 | 249 |
| 243 | 242 | 241 | 242 |
| 244 | 237 | 243 | 250 |
| 245 | 245 | 243 | 244 |
| 246 | 239 | 245 | 254 |
| 247 | 245 | 246 | 246 |
| 248 | 240 | 248 | 255 |
| 249 | 249 | 248 | 247 |
| 250 | 244 | 250 | 255 |
| 251 | 249 | 251 | 249 |
| 252 | 249 | 252 | 254 |
| 253 | 254 | 252 | 254 |
| 254 | 253 | 254 | 254 |
| 255 | 255 | 255 | 255 |

The method in accordance with the invention notably enables optimized reproduction of medical gray scale images on conventional color display systems by way of:

a calculation of a look-up table that is adapted to the display properties of the display system (calibration, effect of the ambient light);

control of the image reproduction in the display system in respect of luminance and color point;

controlled addition of color deviations so as to enhance the differentiation of different shades of gray;

avoiding the loss of shades of gray that occurs in customary LUT methods because of the limitation of the graphic cards to output values of 8 bits.

Because use can be made of customary components, moreover, it is not necessary to use expensive graphic cards that have been developed especially for medical applications.

What is claimed is:

1. A method of reproducing a gray scale image in colors, comprising the step of assigning a color value (x, y) and a brightness (Y) to each shade of gray to provide a three-dimensional space having increasing shades of gray, wherein the assignment between shades of gray and brightness is monotonic, wherein the assigned color values are selected from a range (U) of a predetermined reference color $(X_R, y_R)$, and wherein the assignment of color values enables the human eye to differentiate between successive shades of gray.

2. A method as claimed in claim 1, characterized in that the reference color $(x_R, y_R)$ is white.

3. A method as claimed in claim 1, characterized in that different color values are assigned to two successive shades of gray.

4. A method as claimed in claim 3, characterized in that the assignment between shades of gray and color values is bijective.

5. A method as claimed in claim 4, characterized in that a recurrent series of m≦n different color values $((x_1, y_1), \ldots, (x_m, y_m))$ is assigned to the n shades of gray in an ascending order.

6. A method as claimed in claim 5, characterized in that the reproduction of the gray scale image in colors takes place on a color monitor (6), the assignment between shades of gray on the one side and color values (x, y) and brightness (Y) on the other side being adapted to the dynamic range of the monitor.

7. A method as claimed in claim 6, characterized in that the rule of assignment between the shades of gray and the control of the primary colors of the color monitor (6) is stored in a look-up table (4, 5).

8. A method as claimed in claim 7, characterized in that the look-up table (4, 5) also takes into account the effect of the ambient brightness.

9. A device for reproducing a gray scale image in colors, which device includes a transformation unit (3) which assigns a color value (x, y) and a brightness (Y) of the display to each shade of gray (2), characterized in that the transformation unit is arranged in such a manner that it is capable of carrying out a method as claimed in claim 8.

10. A device as claimed in claim 9, characterized in that it includes a color monitor (6) for reproducing the gray scale image in colors, and that the transformation unit assigns the driving of the primary colors (R, G, B) of the color monitor to the shades of gray.

11. A method as claimed in claim 1, characterized in that the three-dimensional space is cylindrical.

12. A method as claimed in claim 1, characterized in that the increasing shades of gray increase along a spiral-like line.

* * * * *